March 10, 1936.    D. MILLER    2,033,777
VEHICLE WINDOW VENTILATOR
Filed Aug. 2, 1933
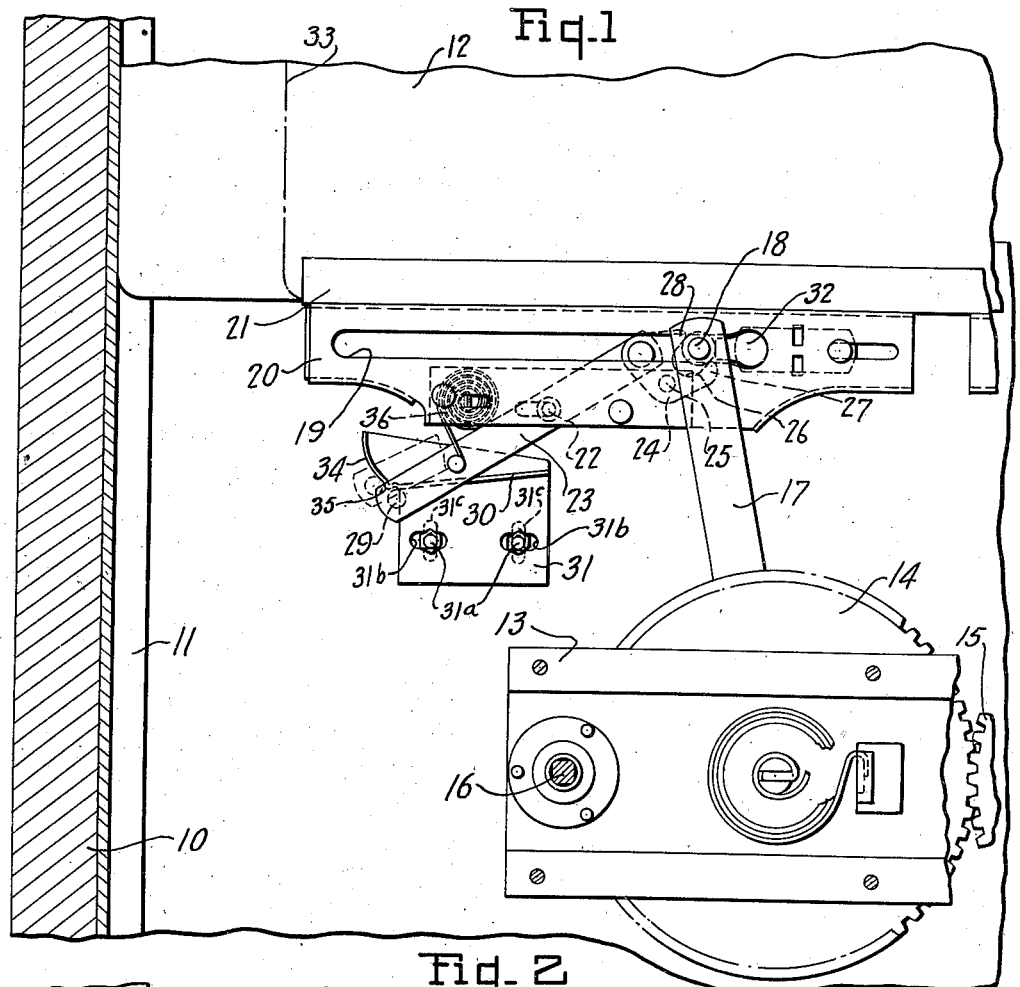
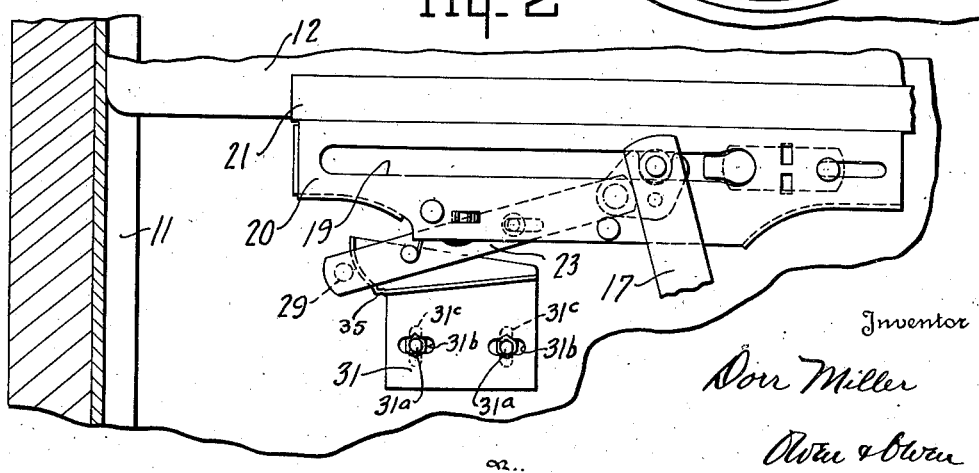
Inventor
Don Miller
Owen & Owen
Attorneys Patented Mar. 10, 1936

2,033,777

UNITED STATES PATENT OFFICE 2,033,777

VEHICLE WINDOW VENTILATOR

Dorr Miller, Detroit, Mich., assignor, by mesne assignments, to Automobile Ventilation, Inc., Detroit, Mich., a corporation of Michigan Application August 2, 1933, Serial No. 683,362

8 Claims. (Cl. 268—126)

This invention relates to so-called "draftless ventilation" for automobiles and other vehicles and is particularly concerned with an improvement of the mechanism shown and described in my co-pending application Serial No. 677,351, wherein I have shown a ventilator in which the window can be moved vertically and in addition longitudinally of a ventilating opening.

According to this invention, the window is enabled to be securely retained in closed position to prevent the window from being moved longitudinally of the vehicle by a force exerted directly against it, as by the insertion of a screw driver between the edge of the window and runway, thereby forcing the window open and affording unwarranted access to the interior of the vehicle.

It is also an object to provide means for indicating to the operator that the window is closed and further actuation of the operating mechanism will provide the ventilating opening. Other objects and advantages of the invention will hereinafter appear, and one embodiment is shown for illustrative purposes in the accompanying drawing, in which—

Figure 1 is a side elevation partly in section of the front portion of the mechanism, showing the window in closed position and the parts arranged in the proper position for imparting longitudinal movement to the window, it being understood that one arm of the double arm regulator is omitted; and Figure 2 is a fragmentary elevation showing the position the parts assume after the regulator mechanism has moved slightly in the direction to lower the window.

The illustrated embodiment of this invention comprises a ventilator for vehicle windows particularly useful in connection with automobiles in which the window can move vertically in the usual manner, but when in raised or closed position the window is movable longitudinally of the vehicle to provide a ventilating opening between one vertical edge of the window and the adjacent runway. Only so much of the door and regulator structure is shown in the drawing as to be sufficient to describe the present invention, which is concerned principally with means for holding the window in raised or closed position against a force exerted directly against the window tending to move it longitudinally.

Referring more specifically to the drawing, 10 designates a vehicle door having the usual well for the window 12 and runways or guide channels 11 at opposite vertical side edges of the window, only one runway being shown in the drawing. Mounted on the door is a supporting plate 13 carrying the regulator mechanism. The regulator mechanism is of a double arm type, but only a single arm is shown on the drawing, as this will be sufficient to enable the invention to be understood. As shown, gears 14 and 15 mesh with each other and are actuated by a pinion to which a handle shaft 16 is connected for operation. Fixed to the gear 14 and extending outwardly therefrom is an arm 17 having a button or roller 18 at its outer end. The button 18 engages in a horizontally elongate slot 19 formed in a rail 20, which is fixed to and depends from a channel 21, which is fixed to the lower edge of the window 12. It will be understood that double arm regulators are old in the art and the actuation thereof enables the window to be raised or lowered.

Connected to the rail 20 below the slot 19 by a pin and slot connection 22 intermediate the ends thereof is a lever arm 23, the upper end of which is pivoted to a yoke 24 which in turn is pivoted at 25 to the rail 20. The yoke is provided with a substantially U-shaped cut-out or recess 26 providing opposed abutments 27 and 28. Extending laterally from the opposite end of the lever arm 23 is a lug 29 which is adapted to engage the under side of a flange 30, which is a part of a plate 31 fixed to the door by bolts and nuts 31ª disposed in slots 31ᵇ and 31ᶜ in the plate and door respectively affording vertical and horizontal adjustment of the plate for facilitating assembly and proper positioning of the parts.

As the arm 17 swings in a clockwise direction, the window 12 is raised toward a closed position and as the button 18 travels to the right of the slot 19 (Fig. 1), first engages the abutment 27 of the yoke 24 and swings the upper end of the lever arm 23 upwardly causing the lug 29 to be swung downwardly beneath the flange or cam 30. When the window is raised the button 18 engages a stop 32 at one end of the slot 19. Upon further movement of the regulator mechanism the window 12 is moved longitudinally of the vehicle, the dot and dash line 33 showing the extent to which the window can be moved longitudinally to provide the ventilating opening. It will also be understood that upon actuation of the arm 17 to the left of Fig. 1, the button 18 engages the abutment 28 and thereby positively moves the window 12 to the left of the figure, thereby closing the ventilating opening and after the opening has been closed upon further movement of the regulator the window can be lowered in the usual manner.

It is desired to hold the window 12 in raised or closed position to prevent the window from being moved longitudinally, as by means of a tool, such as a screw driver, inserted between one edge of the window and the adjacent runway and prying the window open and thus obtain unwarranted access to the inside of the vehicle. For this purpose, at one end of the flange 30 is an upright flange or abutment 34 over which the lug 29 on the lever arm 23 is adapted to ride.

Where the flange or abutment 34 joins the flange 30, a hump or enlargement 35 is provided so that when the window is raised to closed position or when the window has been moved longitudinally of the vehicle to close the ventilating opening, the movement of the lug 29 over the enlargement 35 affords such friction or resistance as to indicate to the operator that the window is in the closed position and further actuation of the regulator handle will either move the window longitudinally or lower the window in accordance with the direction of rotation of the handle. It will be seen that after the lug 29 has been moved over the hump or enlargement 35, longitudinal movement of the window in the plane of the window by a force exerted directly against the window is blocked by the lug 29 bearing against the abutment 34, and so long as the lug is in this position the window cannot be moved, except by manipulation of the regulator handle. Thus it might be said that the window when in raised or closed position is locked in place and unwarranted access to the inside of the vehicle is effectively prevented.

As shown in Fig. 2, further actuation of the regulator arm 17 to the left rocks the yoke 24 and causes the outer end of the lever arm 23 to swing upwardly out of the path of the downward movement of the window and allow the window and its connected parts to move freely downwardly in the usual manner by means of the regulator arm 17 and its corresponding arm carried by the gear 15. It should be noted that the cam or flange 13 extends horizontally, but inclines slightly upwardly to compensate for the slight vertical movement of the window 12 during its longitudinal shifting movement. It will also be seen that the abutment flange 34 is slightly curved to allow for the swinging movement of the lever arm 23.

A spiral spring 36 is mounted on the rail 20 and has one end connected to the outer end of the lever arm 23 to insure its retention in its raised or inoperative position and also to insure the proper position of the yoke member 24 for engagement by the button 18. It will be understood that the spring 36 militates against a sudden jar or shock disturbing the proper position of the lever arm 23 and associated parts when in inoperative position.

It is to be understood that numerous changes in details of construction, arrangement and operation may be effected without departing from the spirit of the invention, especially as defined in the appended claims.

What I claim is:

1. In a vehicle body having a window and a well therebelow, regulator mechanism for raising and lowering said window and moving the same longitudinally of the vehicle in one direction or the other when the window is raised thereby to provide and close a ventilating opening through which air may be withdrawn from the vehicle, means for blocking longitudinal movement of the window by a force exerted directly against the window when the latter is in raised position, and means located interiorly of the well of the window for indicating to the operator substantially the instant at which longitudinal movement of the window in an opening direction is to be initiated.

2. In a vehicle body having a window, regulator mechanism for raising and lowering said window and moving the same longitudinally of the vehicle in one direction or the other when the window is raised thereby to provide and close a ventilating opening through which air may be withdrawn from the vehicle, and frictional means for indicating to the operator through the sense of feel substantially the instant at which longitudinal movement of the window in an opening direction is to be initiated.

3. In a vehicle body having a window and a window well, regulator mechanism for raising and lowering said window and moving the same longitudinally of the vehicle in one direction or the other when the window is raised thereby to provide and close a ventilating opening through which air may be withdrawn from the vehicle, and means located within the well of the window and cooperating with said regulator mechanism for indicating to the operator substantially the instant at which longitudinal movement of the window in an opening direction is to be initated.

4. In a vehicle body having a window, regulator mechanism for raising and lowering said window and moving the same longitudinally of the vehicle in one direction or the other when the window is raised thereby to provide and close a ventilating opening through which air may be withdrawn from the vehicle, said mechanism including an arm movable with the window and connected and arranged to be moved to operative position upon longitudinal movement of the window, a stationary flange extending approximately in the direction of such longitudinal movement and having an upwardly extending abutment at one end portion thereof, and a lug projecting laterally from one end of said arm and engageable with said flange when in operative position, said lug and abutment being so arranged that when said window is in closed position said lug engages thereagainst thereby to block opening movement of the window by a force exerted directly against the window.

5. In a vehicle body having a window mounted for vertical and longitudinal movements in the plane of the glass, regulator mechanism including a swinging arm engageable at the lower edge of the glass for raising and lowering the same and also for moving the glass longitudinally in its plane into or out of position to provide a ventilating opening at one upright edge of the window, an arm movably mounted on the lower edge of the window, and a member fixed to the body having a portion engageable with a part on said arm for blocking longitudinal movement of the window against a force exerted directly against the window when in raised position.

6. In a vehicle body having a window mounted for vertical and longitudinal movements in the plane of the glass, regulator mechanism including a swinging arm engageable at the lower edge of the glass for raising and lowering the same and also for moving the glass longitudinally in its plane into or out of position to provide a ventilating opening at one upright edge of the window, an arm movably mounted on the lower edge of the window, and a member fixed to the body having a cam surface engageable with a projection on said arm for blocking longitudinal movement of the window against a force exerted directly against the window when in raised position.

7. In a vehicle body having a window mounted for vertical and longitudinal movements in the plane of the glass, regulator mechanism including a swinging arm engageable at the lower edge of the glass for raising and lowering the same and also for moving the glass longitudinally in its plane into or out of position to provide a ventilating opening at one upright edge of the window, a spring influenced arm movably mounted on the lower edge of the window, and a member fixed to the body having a portion engageable with a part on said arm for blocking longitudinal movement of the window against a force exerted directly against the window when in raised position.

8. In a vehicle body having a window, regulator mechanism for raising and lowering said window and for shifting the same into and out of ventilating position when the window is raised thereby to provide and close a ventilating opening through which air may be withdrawn from the vehicle or may enter the vehicle, and means cooperating with said regulator mechanism for indicating to the operator substantially the instant at which the shifting movement of the window into ventilating position is to be initiated.

DORR MILLER.